US005833420A

United States Patent [19]

Schmidle et al.

[11] Patent Number: 5,833,420

[45] Date of Patent: Nov. 10, 1998

[54] ATTACHMENT MEMBER SETTING TOOL AND METHOD OF SETTING THE ATTACHMENT MEMBER

[75] Inventors: Josef Schmidle, Göfis; Dimitrios Stefanoudakis, Vienna, both of Austria

[73] Assignee: Hilti Aktiengesellschaft, Schaan, Liechtenstein

[21] Appl. No.: 883,016

[22] Filed: Jun. 26, 1997

Related U.S. Application Data

[63] Continuation of Ser. No. 257,250, Jun. 8, 1994, abandoned.

[30] Foreign Application Priority Data

Jun. 8, 1993 [DE] Germany .......................... 43 18 965.2

[51] Int. Cl.[6] ...................................................... F16B 15/00

[52] U.S. Cl. ............................................ 411/441; 411/533

[58] Field of Search .................................... 411/441, 440, 411/531, 533, 542

[56] References Cited

U.S. PATENT DOCUMENTS

| | | | |
|---|---|---|---|
| 2,663,259 | 12/1953 | Catlin | 411/440 |
| 4,286,496 | 9/1981 | Harris | 411/441 |
| 4,380,413 | 4/1983 | Dewey | 411/531 |
| 4,452,023 | 6/1984 | Stahlberg | 411/531 |
| 4,726,164 | 2/1988 | Reinwall | 411/533 |
| 4,757,661 | 7/1988 | Hasan | 411/533 |
| 4,757,662 | 7/1988 | Gasser | 411/542 |
| 4,799,845 | 1/1989 | Hrysko | 411/542 |
| 5,125,616 | 6/1992 | Rothenbuehler | 411/441 |
| 5,171,118 | 12/1992 | Rothenbuhler | 411/533 |
| 5,217,339 | 6/1993 | O'Connor | 411/533 |

FOREIGN PATENT DOCUMENTS

| | | |
|---|---|---|
| 1603703 | 7/1970 | Germany . |
| 1166301 | 10/1969 | United Kingdom . |

*Primary Examiner*—Lloyd A. Gall
*Assistant Examiner*—Gary Estremsky
*Attorney, Agent, or Firm*—Anderson, Kill & Olick, P.C.

[57] ABSTRACT

Attachment members (28) are used for securing insulation panels (30) to structural components (31). Each attachment member (28) includes a nail (29) which is driven by a setting tool into the structural component. A connecting region (26*a*) on guide tube (25) of the setting tool generates a frictional force with a counter-connecting region of a hollow shaft (28*b*) in the attachment member when the nail (29 is driven. By means of the generated frictional force it is possible to check if the attachment member is properly connected after the setting tool drives the nail. The frictional force between the guide tube (25) and the inside surface of the hollow shaft is greater than the frictional force between the hollow shaft (28*b*) and the insulation panel (30).

2 Claims, 5 Drawing Sheets

ATTACHMENT MEMBER SETTING TOOL AND METHOD OF SETTING THE ATTACHMENT MEMBER

This is a continuation application of Ser. No. 08/257,250, filed Jun. 8, 1994. now abandoned.

BACKGROUND OF THE INVENTION

The present invention is directed to an attachment member, a setting tool and a method for securing the attachment member used for fastening insulation plates to structural components by means of the explosive powder charge operated setting tool. The attachment member has a large area head, a hollow shaft extending axially from the head and penetrating through the installation panel with an abutment within the hollow shaft for a nail driven by a setting tool into the structural component.

An attachment member for securing insulation panels to structural parts is disclosed in DE-OS 39 31 833 with the attachment member secured to a structural component by a nail. The attachment member has a large area head, a hollow shaft connected to the head as a single element and the nail. A radially up settable sleeve is located in the hollow shaft and has an end which serves as an abutment for a head of the nail. Initially, in the attachment operation, the hollow shaft of the attachment member is pushed through the insulation panel formed mainly of a material with a low compressive strength. The attachment member head comes to rest against the insulation panel while the opposite end of the hollow shaft abuts against the structural component. The nail is driven through the hollow shaft into the structural component by a setting tool using an explosive powder charge. At the end of the driving step, the head of the nail impacts against the abutment whereby the attachment member and the insulation panel is secured to the structural component.

When nails are being driven flaws or breakdowns can occur, whereby the attachment member is not effectively anchored. Such flaws can occur when the nail is driven into a gap or joint such that the nail is not secured to the structural component. Other flaws can occur if the wrong amount of driving energy is supplied by the setting tool or when the fastening members are driven into an edge region of the structural component.

In actual practice, it has been noted that inexperienced or inadequately trained setting tool operators are unable visually to identify setting flaws. In particular, when setting attachment members in thermal insulation panels formed of a hard-foamed material, it has often been observed that failed attachment members stick in the hard-foamed material due to increased friction between the hollow shaft and the hard-foamed material with the result that they are considered to be correctly set members.

SUMMARY OF THE INVENTION

Therefore, the primary object of the present invention is to provide a method of securing attachment members used for fastening insulation panels to structural components where an inadequate attachment can be recognized.

Another object of the invention is to provide an attachment member which can be used effectively in the above method.

Still another object of the present invention is to provide a guide tube for the setting tool which, in combination with the attachment member, can effectively carry out the inventive method.

In accordance with the present invention, the attachment member can be connected with a region of the setting tool before the nail is driven and such connection is releasable after driving the nail by overcoming a force greater than the frictional force between the hollow shaft and the insulation panel.

The inventive method enables the identification of a flawed or inadequate securement of the attachment member because of a failure in the setting operation whereby a tensile force acts on the attachment member when the setting tool is removed after the completion of the setting operation, whereby the tensile force corresponds to the frictional force afforded by the connection between the region of the setting tool and the attachment member. If there is a failure in the setting operation, the attachment member is at least partially pulled out of the insulation panel, so that its large area head is spaced from the outwardly facing surface of the insulation panel.

Preferably, the connection with a region of the setting tool is effected by introducing a guide tube on the setting tool into the hollow shaft of the attachment member. The region of the setting tool has a cross-sectional area with a diameter slightly greater than the inside diameter of the hollow shaft, whereby a frictional force is generated by the coaction of the region on the setting tool with the hollow shaft of the attachment member with the frictional force generated being larger than the frictional force between the outside wall surface of the hollow shaft and the insulation panel fixed by the attachment member to a structural component or part.

To limit the frictional force to a specific region of the attachment member, the guide tube has a connecting region. Such a connecting region can be located at the free end of the guide tube or, if the guide tube extends deeply into the attachment member, at a region corresponding to a rearward region of the attachment member.

The frictional force developed between the attachment member and the guide tube can be effected preferably by profiling the connecting region. A knurled surface, a circumferential knurled surface, or at least a projection or recess can provide the requisite profiling. Since insulation panels are commercially available in different thicknesses, attachment members of different axial lengths are also offered. If the spacing between the engagement surface of the attachment member for the free end of the guide tube extending transversely of the axis of the attachment member and the connecting region are different, preferably the connecting region is disposed on a separate part axially displaceable relative to the guide tube. As a result, the connecting region is axially displaceable with respect to the guide tube. Axial displacement can be effected by an outside thread on the guide tube and a corresponding inside thread on the separate part. A safety pin or a set screw can serve for fixing the two parts together.

Preferably, the attachment member has a counter-connecting region in the inside surface of the hollow shaft. Accordingly, corresponding surfaces generating frictional forces are arranged on the attachment member and cooperate with the connecting region of the setting tool or with an outside surface on the guide tube.

It is expedient if the counter-connecting region on the inside surface of the hollow shaft is profiled. Such profiling can be formed by knurling, circumferential knurling, or at least one projection or one recess or preferably by axially extending ribs extending along the inside surface of the hollow shaft. The size and, as a result, the frictional force of the counter-connecting region cooperating with the outside surface of guide tube can be changed by the disposition of the longitudinal or axially extending ribs. By increasing the width of the rib the frictional force can be increased.

Preferably, several longitudinal ribs are arranged around the circumference of the inside surface of the hollow shaft. Radial guidance of the guide tube on the setting tool inside the hollow shaft of the attachment member is achieved by the uniform distribution of the axially extending ribs.

Preferably, the inside surface of the hollow shaft bounded by the inner surfaces of the ribs is designed to be cylindrical. An attachment member designed in such a way can be brought into connection with a guide tube of the setting tool whose connecting region has a cylindrical outside surface. The outside diameter of the guide tube is slightly larger in comparison with the diameter of the inside opening of the hollow shaft bounded by the axially extending rib, so that the connection between the guide tube and the attachment member after the nail in the attachment member is driven, can be detached or separated only by overcoming a force exceeding the frictional force between the hollow shaft and an insulation panel.

Profiled surfaces in the connecting region of the guide tube or even the counter-connecting region of the hollow shaft afford a positive assist in generating the frictional force, so that the connecting regions can be made very short with respect to their axial extent. This feature has a positive effect on the design consideration of the attachment member and the guide tube, as well as upon the duration of the force application required for placing the attachment member on the guide tube or when removing the guide tube from the attachment member.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
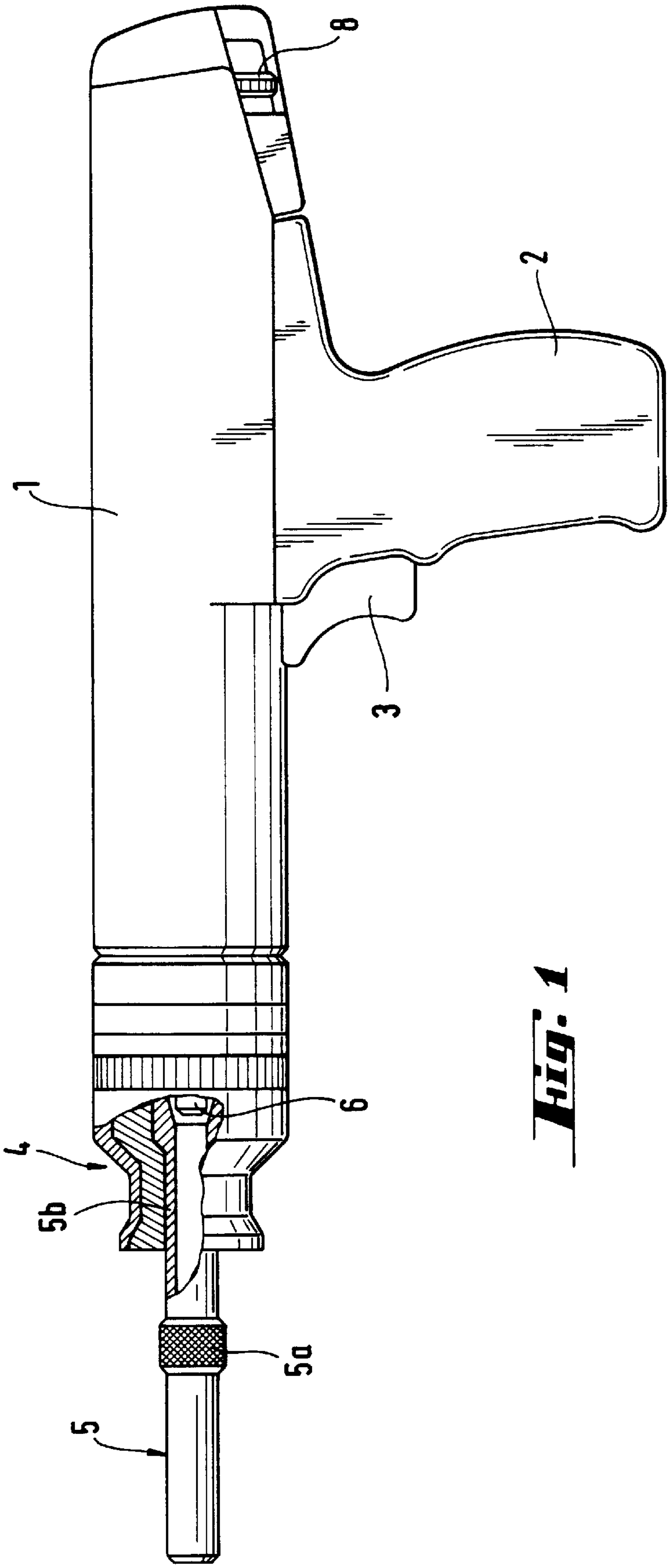
FIG. 1 is a side view, partly in section, of an explosive powder charge operated setting tool with a guide tube embodying the present invention.

In FIG. 1 an explosive powder charge operated setting tool is illustrated comprising a housing 1 with a handle 2 extending downwardly from the housing and containing an actuating switch 3. A receiving region 4 for a guide tube 5 is located at the forward end of the housing and the leading end of an axially displaceable piston 6 can be noted in the front end of the housing. An adjustment device 8 is located at the rear end of the housing for optimizing the output energy of the tool.

Figure 2:
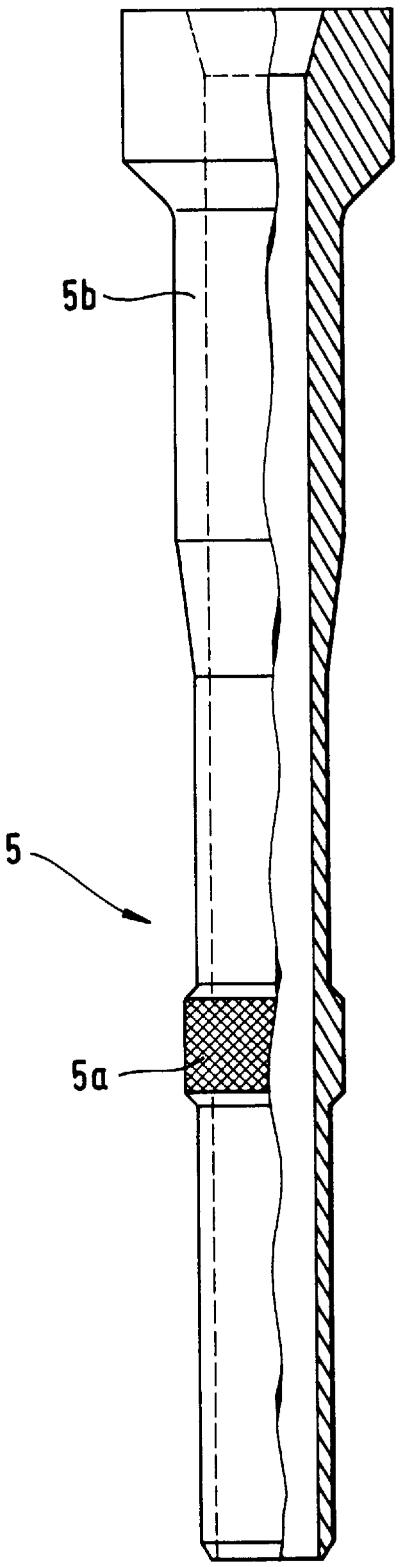
FIG. 2 is an enlarged partly sectional view of the guide tube illustrated in FIG. 1.

At least one cartridge, not shown, can be placed in the setting tool and can be ignited by the actuating switch 3 with the assistance of a known mechanical device. The explosive pressure generated by the cartridge acts on a trailing end of the piston, that is, an end facing toward the handle 2, and displaces the piston in the setting direction, that is, to the left as viewed in FIG. 1. Guide tube 5 shown enlarged in FIG. 2, has a connecting region **5*a* and an insertion end 5*b* for cooperating with the receiving region in the setting tool. The connecting region 5*a* extends axially for at least a part of the axial length of the guide tube 5 and extends radially outwardly from the outside surface of the tube. The surface of the connecting region 5*a*** is profiled with a circumferentially extending knurling.

Figure 3:
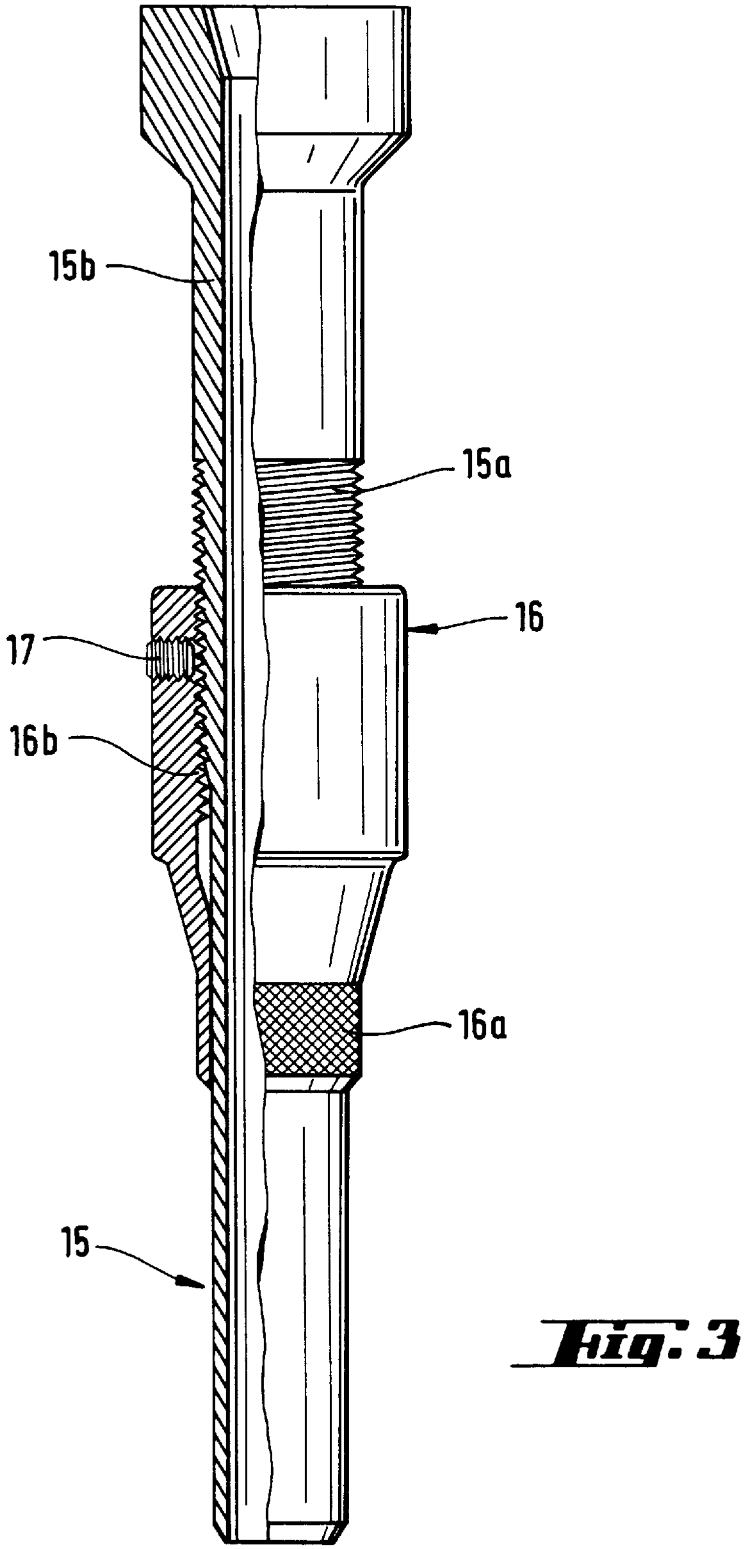
FIG. 3 is another guide tube, shown partly in section, which can be placed on the setting tool displayed in FIG. 1.

In FIG. 3 another guide tube 15 is shown including a separate part 16 arranged to be axially displaceable on the guide tube by a threaded connection **15*a*, 16*b*. A set screw 17 extending through the separate part 16 into contact with the guide tube 15 is an anti-rotation device. A connecting region 16*a* projecting radially outwardly from the outside surface of the guide tube 15 is formed as a unitary part of the separate part 16 and has a profiled surface formed by a circumferential knurling. An insertion end 15*b* of the guide tube 15** can be engaged with a receiving region of a setting tool.

Figure 4:
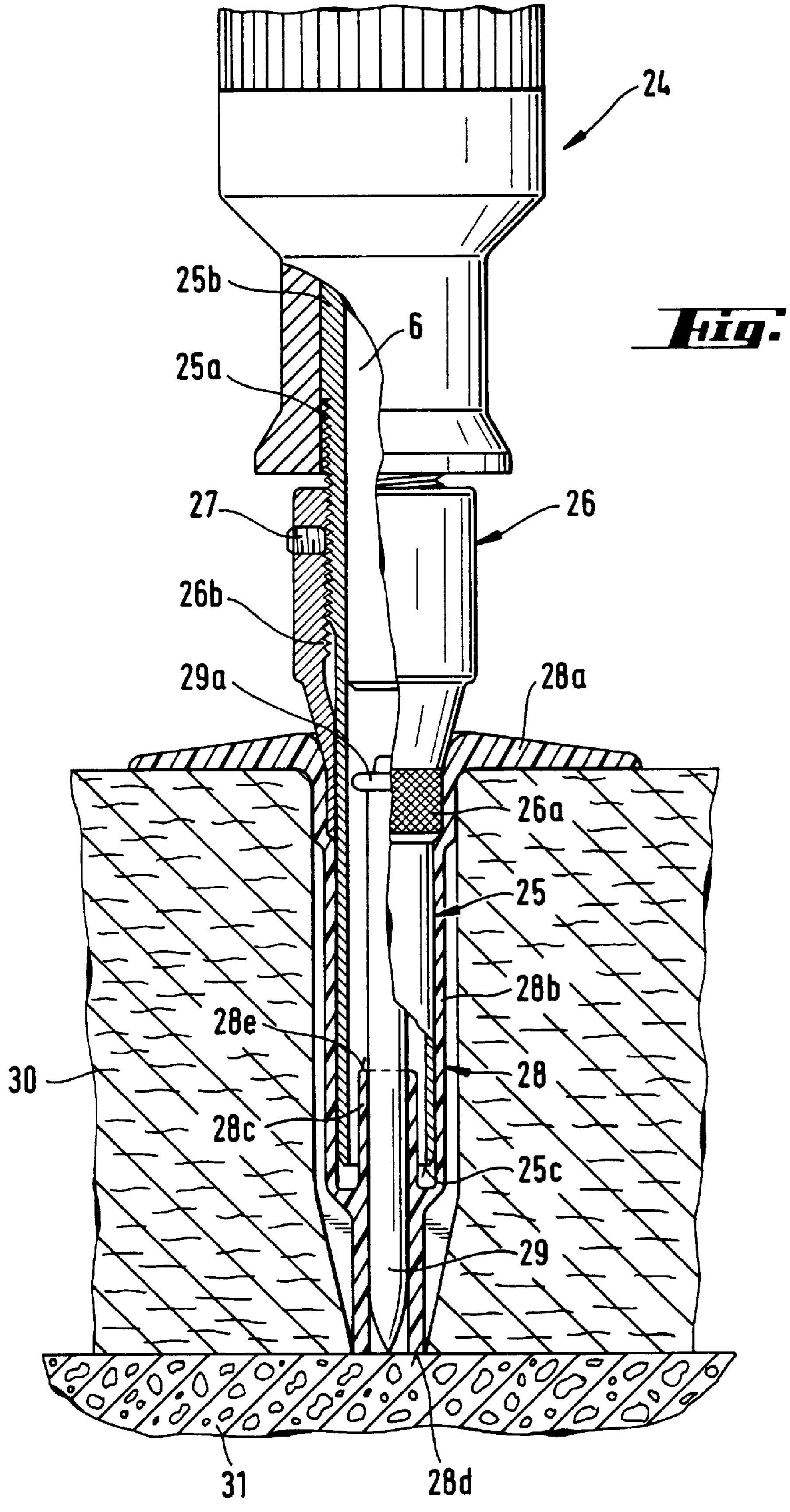
FIG. 4 is still another guide tube, shown partly in section, along with an attachment member extending through an insulation panel and arranged to be connected to a structural component.

Another guide tube 25 is illustrated in FIG. 4 and has an insertion end **25*b* fitted into the receiving region 24 of a setting tool, not shown in detail. A separate part 26 with an inside thread 26*b* is disposed on the guide tube 25 and the inside thread 26*b* engages an outside thread 25*a* on the guide tube 25. Accordingly, the separate part 26 is detachably connected with the guide tube. The separate part 26 can be fixed non-rotatably with respect to the thread 25*a* in guide tube 25 by a set screw 27 in threaded engagement with the separate part 26. A connecting region 26*a* is formed as a unitary part of the separate part 26 and projects radially outwardly beyond the outside diameter of the guide tube 25**.

Figure 5:
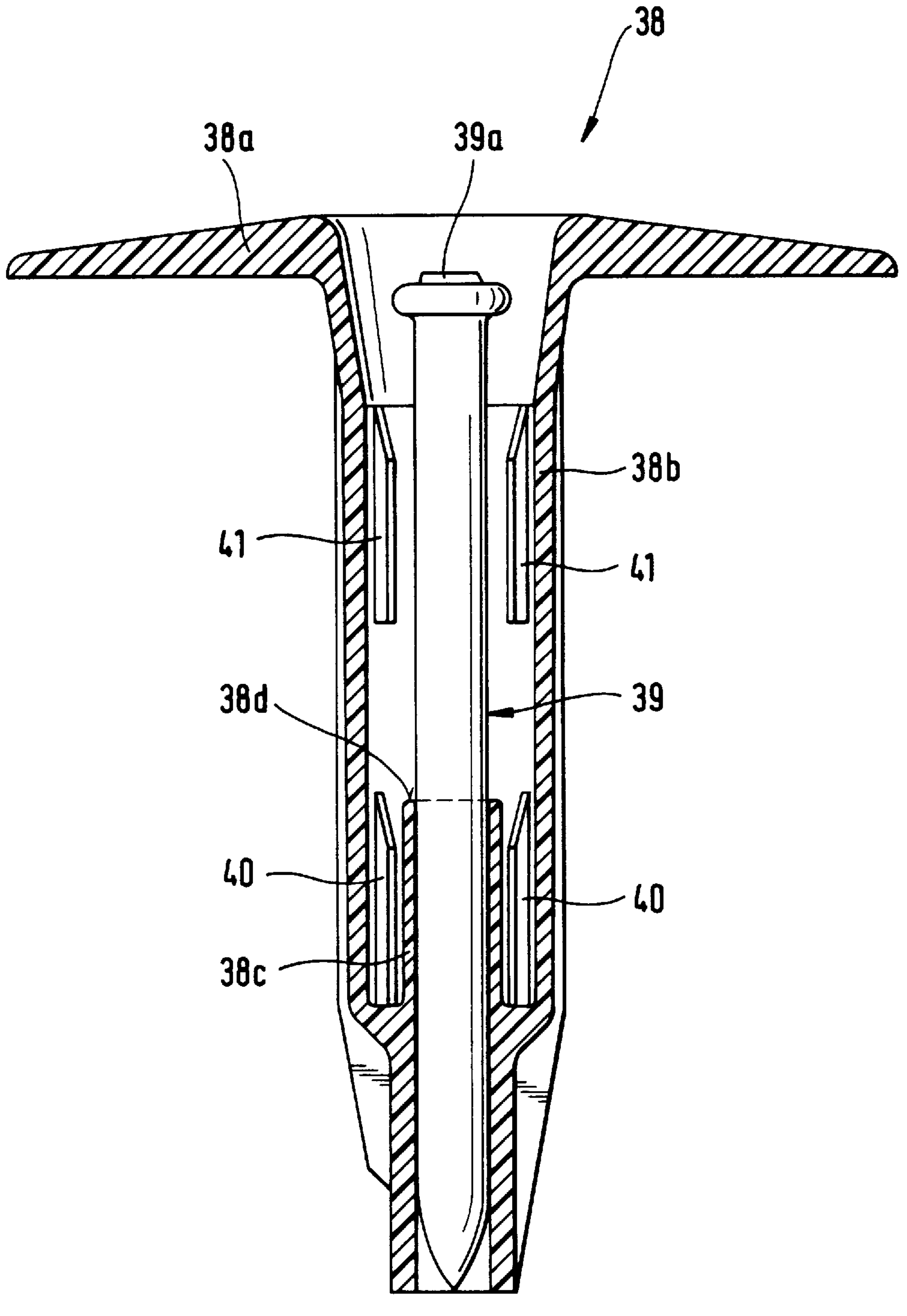
FIG. 5 is another attachment member embodying the present invention, shown enlarged and in section.

Guide tube 25 extends axially into the interior of a hollow shaft **28*b* of the attachment member 28 with the connecting region 26*a* in frictional connection with a widened section or counter-connecting region of the inside surface of the hollow shaft 28*b* adjacent head 28*a* on the attachment member 28. The counter-connecting region can be profiled. Attachment member 28 has the large area head 28*a*, a nail 29 located within the hollow shaft 28*b*, and a radially upsettable axially extending sleeve 28*c* with an upwardly facing end 28*e* which serves as an abutment for the head 29*a* of the nail 29 after it is driven into the structural component 31. The leading or free end 25*c* of the guide tube 25 projects into the inside of the hollow shaft 28*b* at least partially overlapping the upsettable sleeve 28*c* . In the position shown in FIG. 4, before carrying out the setting operation, the hollow shaft 28*b* of the attachment member 28 extends through an insulation panel 30 and abuts at its leading end 28*d* against the surface of structural component 31. The large area head 28*a* of the attachment member 28 rests on the outside surface of the insulation panel 30, that is, the surface facing away from the structural component 31. In FIG. 5 an attachment member 38 is illustrated with a large area head 38*a* extending transversely of an axially extending hollow shaft 38*b*. One end of the shaft is connected to the head 38*a* and the other end is arranged to bear against the surface of a structural component, such as shown in FIG. 4. A nail 39 extends axially within the hollow shaft 38*b* and a portion of the nail extends through a radially upsettable sleeve 38*c* with the upper or trailing end of the sleeve forming an abutment 38***d* for a head 39*a* of the nail when it is driven into a structural component. Axially extending ribs 40, 41 are formed on and extend inwardly from the inside surface of the hollow shaft 38 with the ribs spaced angularly apart around the inside circumference of the hollow shaft. One set of ribs 40 is located in the region of the sleeve 38*c* and the other set of ribs 41 is located closer to the head 38*a*.

Ribs 40, 41 extend essentially radially inwardly from the inside surface of the hollow shaft 38*b* with one set of ribs 40 spaced from the other set 41 in the axial direction of the hollow shaft 38*c*. In FIG. 5 only two ribs 40 and 41 of a total of three ribs in each set are visible. The axially extending ribs are spaced approximately 120° C. apart from one another. As viewed in FIG. 5 the upwardly facing ends of the ribs, that is, the ends closer to the head 38*a*, have a decreasing height, that is, they slope outwardly toward the inside surface of the hollow shaft. The inside opening in the hollow shaft 38*b* bounded by the radially inner surfaces of the longitudinal ribs 40, 41 is cylindrically shaped and serves for affording radial guidance for the guide tube of a setting tool. The ribs 41 form a profiled counter-connecting region.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

We claim:

1. Attachment member including a fastening element for securing an insulation panel to a structural component where a setting tool is used for driving a fastening element into the structural component, said fastening element having a leading end to be driven first into the structural component and a trailing end having a head projecting laterally outwardly from a shank of said fastening element extending between the leading end and trailing end, said attachment member comprising an axially elongated hollow shaft having a first end and a second end spaced apart in the axial direction and arranged to receive the fastening element therein, shaft an attachment member head secured to and extending outwardly from the first end of said hollow shaft transversely of the axial direction thereof, said hollow shaft having an axially extending inside surface between the first and second ends thereof, said fastening element head being spaced axially inwardly from the attachment member head; said inside surface extending from the second end thereof and having an axially extending first diameter section whose diameter is substantially the same as the shank of the fastening element for holding the fastening element and a larger second diameter section extending from the first diameter section towards the first end with the second diameter section being spaced radially outwardly from the fastening element head, said attachment member head having a clear opening therethrough opening to said second diameter section of said inside surface of said hollow shaft and said clear opening having a diameter at least equal to the second diameter section and at least one axially extending counter-connecting region formed by axially extending ribs in said second diameter section spaced axially inwardly from said attachment member head for frictional connection to a surface of the setting tool insertable into the larger second diameter section, said ribs being spaced circumferentially apart around said inside surface and extending radially inwardly from said inside surface, said ribs being secured to said inside surface for the axially extending extents thereof, said ribs having an axially and circumferentially extending radially inner surface means for effecting the frictional connection to a surface of the setting tool, said radially inner surface means of said ribs spaced uniformly for the axial extent thereof from a center axis of said attachment member, said ribs spaced axially inwardly from said first end of said hollow shaft so that an axially extending clear space free of said ribs is located between said ribs and said attachment member head, an axially extending and radially upsettable sleeve is located within said second diameter section extending axially from said first diameter section and having an inside diameter corresponding to the diameter of said first diameter section and an outside diameter less than the diameter of said second diameter section with at least some of said ribs located in an axial range of said sleeve, with said inner surface of said ribs being spaced radially outwardly from the outer diameter of said sleeve, said sleeve serving as a guide for the fastening element located within said first diameter section, and the frictional connection between said ribs and the setting tool being releasable after effectively driving the fastening element into the structural component.

2. Attachment member, as set forth in claim 1, wherein said axially extending ribs comprise a first set of said ribs located in an axial range of said sleeve with said inner surface means of said ribs being spaced radially outwardly from the outer diameter of said sleeve, and a second set of said ribs spaced between said first set and a location spaced axially inwardly from said attachment member head and outside of the axial range of said sleeve.

* * * * *